US009870483B2

(12) United States Patent
Cotner et al.

(10) Patent No.: US 9,870,483 B2
(45) Date of Patent: *Jan. 16, 2018

(54) ROW-LEVEL SECURITY IN A RELATIONAL DATABASE MANAGEMENT SYSTEM

(71) Applicant: INTERNATIONAL BUSINESS MACHINES CORPORATION, Armonk, NY (US)

(72) Inventors: Curt Cotner, Gilroy, CA (US); Roger Lee Miller, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/343,568

(22) Filed: Nov. 4, 2016

(65) Prior Publication Data

US 2017/0053133 A1    Feb. 23, 2017

Related U.S. Application Data

(63) Continuation of application No. 12/242,038, filed on Sep. 30, 2008, now Pat. No. 9,514,328, which is a
(Continued)

(51) Int. Cl.
*G06F 17/30* (2006.01)
*G06F 21/62* (2013.01)

(52) U.S. Cl.
CPC .... *G06F 21/6227* (2013.01); *G06F 17/30289* (2013.01); *G06F 17/30595* (2013.01);
(Continued)

(58) Field of Classification Search
CPC ......... G06F 17/30289; G06F 17/30595; G06F 21/6227; G06F 21/6218
See application file for complete search history.

(56) References Cited

U.S. PATENT DOCUMENTS 5,483,596 A    1/1996   Rosenow et al.
5,539,906 A    7/1996   Abraham et al.
(Continued)

FOREIGN PATENT DOCUMENTS

EP    0398645    11/1990
EP    1089194    4/2001
(Continued)

OTHER PUBLICATIONS

Didriksen, Tor, RUle Based Database Access Control—A Practical Approach, Telenor Research and Development, Trondheim, Norway, 1997, pp. 143-151.
(Continued)

*Primary Examiner* — Cam-y Truong
(74) *Attorney, Agent, or Firm* — Sughrue Mion, PLLC

(57) ABSTRACT

Access control methods provide multilevel and mandatory access control for a database management system. The access control techniques provide access control at the row level in a relational database table. The database table contains a security label column within which is recorded a security label that is defined within a hierarchical security scheme. A user's security label is encoded with security information concerning the user. When a user requests access to a row, a security mechanism compares the user's security information with the security information in the row. If the user's security dominates the row's security, the user is given access to the row.

14 Claims, 11 Drawing Sheets

Related U.S. Application Data continuation of application No. 11/746,896, filed on May 10, 2007, now Pat. No. 7,464,080, which is a continuation of application No. 10/233,397, filed on Sep. 4, 2002, now Pat. No. 7,240,046.

(52) U.S. Cl.
CPC .......... *G06F 2221/2113* (2013.01); *G06F 2221/2145* (2013.01); *Y10S 707/954* (2013.01); *Y10S 707/956* (2013.01); *Y10S 707/99933* (2013.01); *Y10S 707/99934* (2013.01); *Y10S 707/99935* (2013.01); *Y10S 707/99939* (2013.01)

(56) References Cited

U.S. PATENT DOCUMENTS

| | | |
|---|---|---|
| 5,572,673 A | 11/1996 | Shurts |
| 5,649,182 A | 7/1997 | Reitz |
| 5,692,179 A | 11/1997 | Ueda |
| 5,751,949 A * | 5/1998 | Thomson ............ G06F 21/6227 726/4 |
| 5,787,428 A | 7/1998 | Hart |
| 5,893,087 A | 4/1999 | Wlaschin et al. |
| 5,913,037 A | 6/1999 | Spofford et al. |
| 5,915,086 A * | 6/1999 | Buzsaki ............ G06F 21/6218 726/28 |
| 5,941,947 A * | 8/1999 | Brown ............ G06F 21/6218 709/225 |
| 5,963,642 A | 10/1999 | Goldstein |
| 5,974,408 A | 10/1999 | Cohen et al. |
| 6,006,234 A | 12/1999 | Govindarajan et al. |
| 6,044,373 A | 3/2000 | Gladney et al. |
| 6,044,378 A | 3/2000 | Gladney |
| 6,098,075 A | 8/2000 | Becraft, Jr. et al. |
| 6,134,549 A | 10/2000 | Regnier et al. |
| 6,219,790 B1 | 4/2001 | Lloyd et al. |
| 6,233,617 B1 | 5/2001 | Rothwein et al. |
| 6,266,673 B1 | 7/2001 | Hong et al. |
| 6,286,104 B1 | 9/2001 | Buhle et al. |
| 6,369,840 B1 * | 4/2002 | Barnett ............ G06Q 10/06314 715/751 |
| 6,405,212 B1 | 6/2002 | Samu et al. |
| 6,446,117 B1 | 9/2002 | Gebauer |
| 6,484,180 B1 | 11/2002 | Lyons et al. |
| 6,487,552 B1 * | 11/2002 | Lei ................. G06F 17/30528 |
| 6,578,037 B1 * | 6/2003 | Wong ............ G06F 17/30471 707/694 |
| 6,606,627 B1 | 8/2003 | Guthrie et al. |
| 6,631,371 B1 | 10/2003 | Lei et al. |
| 6,711,579 B2 | 3/2004 | Balakrishnan |
| 6,775,668 B1 | 8/2004 | Goel |
| 6,820,082 B1 | 11/2004 | Cook et al. |
| 6,922,696 B1 | 7/2005 | Lincoln et al. |
| 6,931,411 B1 | 8/2005 | Babiskin et al. |
| 7,134,022 B2 | 11/2006 | Flyntz |
| 7,240,046 B2 | 7/2007 | Cotner et al. |
| 7,464,080 B2 | 12/2008 | Cotner et al. |
| 2002/0062218 A1 | 5/2002 | Pianin |
| 2002/0069035 A1 | 6/2002 | Tracy et al. |
| 2002/0095405 A1 | 7/2002 | Fujiwara |
| 2003/0046576 A1 | 3/2003 | High, Jr. et al. |
| 2003/0140097 A1 | 7/2003 | Schloer |

FOREIGN PATENT DOCUMENTS

| | | |
|---|---|---|
| JP | 11-259366 | 9/1999 |
| JP | 2002-182983 | 6/2002 |

OTHER PUBLICATIONS

DOD 5200.28-STD, Dept. of Defense Trusted Computer System Evaluation Criteria, Dec. 1985, p. 23, 106-112.

Garvey C. et al., ASD-Views, Proceedings of the Symposium on Security and Privacy, Oakland, California, Apr. 18, 1998, Washington, IEEE Comp. Soc. Press, US, pp. 85-95.

Gladney, H.M., Access Control for Large COllections, IBM Almaden Research Center, ACM Transactions on Information Systems, vol. 15, No. 2, Apr. 1997, pp. 154-173.

M.B. Thuraisingham: Security Checking in Relational Database Management Syssstems Augumented with Inference Engines, Computers and Security, vol. 6, Issue 6, pp. 479-492, 1987; Elsevier SDcience Publishers B.V>.

Sushil Jajodia et al. "TOward a Multilevel Secure Relational Data Modell" Sigmod Record, Association for COmputing Machinery, New York, US vol. 20, No. 2, Jun. 1, 1991, pp. 50-59I.

Thuraisingham M.B. Security Checking in RElational Database Management Systems Augmented with Inference Engines, COmputers & Security, Elsevier Science Publishers. AMsterdam, IL. vol. 6, No. 6, Dec. 1, 1987, pp. 479-492.

Wiseman, SR, et al. INSPEC, Database design with secure DBMS products, Proceedings 11th Annual COmputer Security Applications COnf., New Orleans, LA, USA, Dec. 11-15, 1995, publlished: Los Alamitos CA.

\* cited by examiner

USER.TABLE — 26

| SECLABEL | COL1 | COL2 | COL3 |
|---|---|---|---|
| RED | ABC | 123 | 424 |
| BLUE | UEU | 3183 | 23476 |
| YELLOW | MDM | 3939 | 234 |
| GREEN | OEOE | 393 | 34256 |
| INDIGO | UDUD | 334 | 2324 |
| GREEN | YEYE | 29 | 2346 |
| RED | TRTR | 112 | 345 |
| BLUE | EUE | 572 | 698 |

28a — CREATE VIEW    USER.VIEW
28b — AS   SELECT U.COL1, U.COL2, U.COL3
28c — FROM USER.TABLE AS U, SECURITY.TABLE AS S
28d — WHERE U.SECLABEL = S.SECLABEL AND S.USERID = CURRENT USER

USER.VIEW — 32

| SECLABEL | COL1 | COL2 | COL3 |
|---|---|---|---|
| BLUE | UEU | 3183 | 23476 |
| BLUE | EUE | 572 | 698 |

SECURITY.TABLE — 30

| USERID | SECLABEL |
|---|---|
| JOE | RED |
| SALLY | BLUE |
| SAM | GREEN |

SALLY'S QUERY:
SELECT*FROM USER.VIEW; — 34

FIG.2D

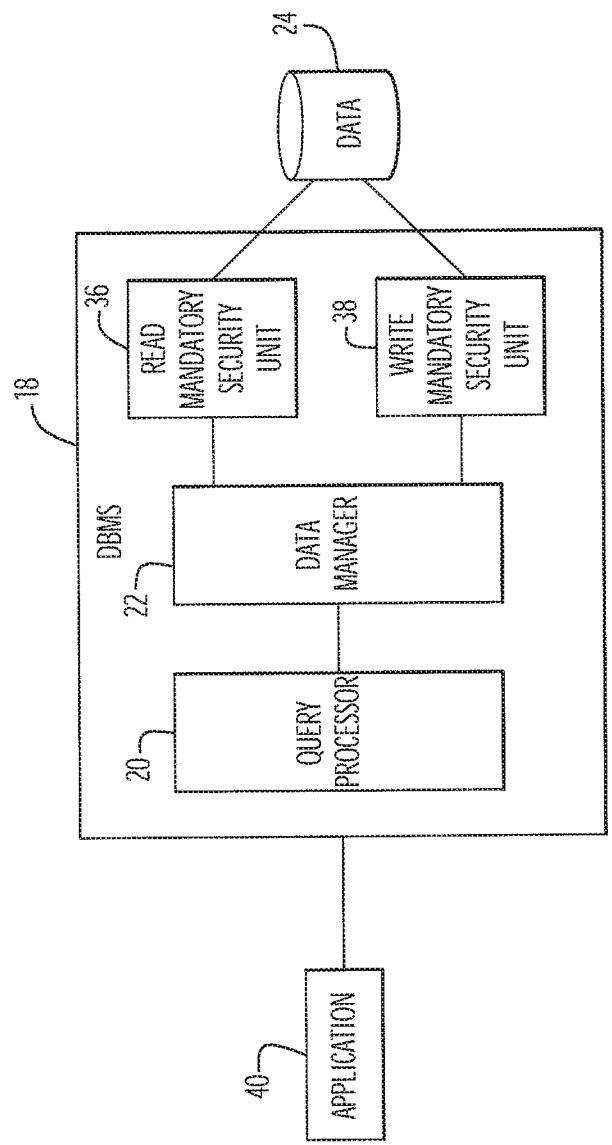

BOSS2'S QUERY:
SELECT*FROM USER.TABLE;

FIG.5A

USER.TABLE (26)

| | SECLABEL | COL1 | COL2 | COL3 |
|---|---|---|---|---|
| 26a | RED | ABC | 123 | 424 |
| 26b | BLUE | UEU | 3183 | 23476 |
| 26c | YELLOW | MDM | 3939 | 234 |
| 26d | GREEN | OEOE | 393 | 34256 |
| 26e | INDIGO | UDUD | 334 | 2324 |
| 26f | GREEN | YEYE | 29 | 2346 |
| 26g | RED | TRTR | 112 | 345 |
| 26h | BLUE | EUE | 572 | 698 |

SECURITY MECHANISM (64)

| USERID | SECLABEL | |
|---|---|---|
| JOE | RED | 64a |
| BOSS1 | RAINBOW | 64b |
| SALLY | BLUE | |
| BIGBOSS | RAINBOW | 64c |
| BOSS2 | SUNSET | 64d |
| SAM | GREEN | |

FIG.5B

ROW-LEVEL SECURITY IN A RELATIONAL DATABASE MANAGEMENT SYSTEM

CROSS-REFERENCE TO RELATED PATENT APPLICATION

This is a continuation of application Ser. No. 12/242,038 filed Sep. 30, 2008 which is a continuation of application Ser. No. 11/746,896 filed May 10, 2007, now patented U.S. Pat. No. 7,464,080, issued Dec. 9, 2008, which is a continuation of application Ser. No. 10/233,397 filed Sep. 4, 2002, now patented U.S. Pat. No. 7,240,046, issued Jul. 3, 2007. The entire disclosure of the prior applications, application Ser. Nos. 10/233,397, 11/746,896 and 12/242,038, are hereby incorporated by reference.

BACKGROUND OF THE INVENTION

Field of the Invention

The invention relates to information processing systems, and more particularly to methods for providing security in database management systems.

Description of the Related Art

With the growth of the World-Wide Web ("web") and e-business solutions, database security and privacy are becoming increasingly critical. Hosting a web site on a server, referred to as web hosting, is another trend that magnifies the importance of database security. The web server includes a relational database storing a customer's data in many related tables. A web hosting company is motivated to store data from many customers in a single database management system to minimize its expenses. However, an increasing number of customers need a higher degree of security than is available with database management systems conventionally used by hosting companies, especially when the database management system is used to host more than one customer's web site and data.

Some customers need mandatory access controls in which all access to a data item, such as a database row, is controlled. Many customers also need to use a hierarchical security scheme that simultaneously supports multiple levels of access control. These concepts of mandatory access controls and hierarchical security schemes are well known. They are described, for example, in a Department of Defense standard DoD 5200.28-STD, *Department of Defense Trusted Computer System Evaluation Criteria*, December 1985, which is incorporated by reference herein.

Conventional relational databases, such as the database described in U.S. Pat. No. 5,751,949 to Thomson et al., provide security based on tables and views of those tables. Views can be used to limit access to selected rows and columns within one or more database tables. For example, in Thomson et al., views are used to join data tables with a security table containing user authorization information. Certain users, however, such as system administrators can bypass views and access tables directly, thereby circumventing the access control provided by views. Also, it is often cumbersome for the database administrator and application programmer to construct views that have the desired level of granularity. Although views can be effective for read-only access, views are more difficult to define for updating, inserting and deleting. Triggers, database constraints and stored procedures are often needed for update controls.

Although many applications need row-level security within a relational database so that individual user access can be restricted to a specific set of rows, there is a need to make the security control mandatory. With mandatory access control, users, application programmers and database administrators are unable to bypass the row-level security mechanism.

SUMMARY OF THE INVENTION

The methods described here provide mandatory row-level security within a relational database. They offer many advantages over conventional database systems that are available today. They can provide a security enforcement mechanism that is mandatory and automatic, that can implement security schemes that would be difficult to express in a traditional Structured Query Language (SQL) view or query, and achieve performance optimizations that minimize processing requirements and elapsed time overhead associated with making row-level security checks. The methods described here also provide a security enforcement mechanism that does not have to rely upon special views or database session variables to provide row-level security controls.

An embodiment of the invention relates to a method of controlling access to a relational database. The method includes receiving a user request for data from the database, in which the request includes a request to perform a database operation and a user security label. User security information is determined from the user security label. In response to the user request, rows of data are retrieved from a table in the database that satisfy the database operation, in which the rows each have a security label. The method further includes determining row security information for each of the retrieved rows based on the row's security label. For each retrieved row the method determines whether the user is authorized to access the row based on the user security information and the row security information. Only the rows for which the user is determined to have authorization to access are returned.

The request from a user does not need to contain a query of a view nor does it require a join of a table containing access control information, in order to limit user access to the database.

Features and advantages of the invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

BRIEF DESCRIPTION OF THE DRAWINGS

FIGS. 2A-D show a database table, SQL statements to create a view, the view, and a query, respectively, that are used in conventional methods for limiting a user's access to certain rows of data in the database table.

FIG. 3 is a block diagram showing an access control system that includes a database management system with a read mandatory security enforcement unit and a write mandatory security enforcement unit that support row-level access control that enables mandatory access control.

FIGS. 5A and B show a query, a database table and a security mechanism employing the security hierarchy illustrated in FIG. 4. The query can be applied to the database table using mandatory row-level security enforcement provided by the security mechanism.

DETAILED DESCRIPTION

Figure 1:
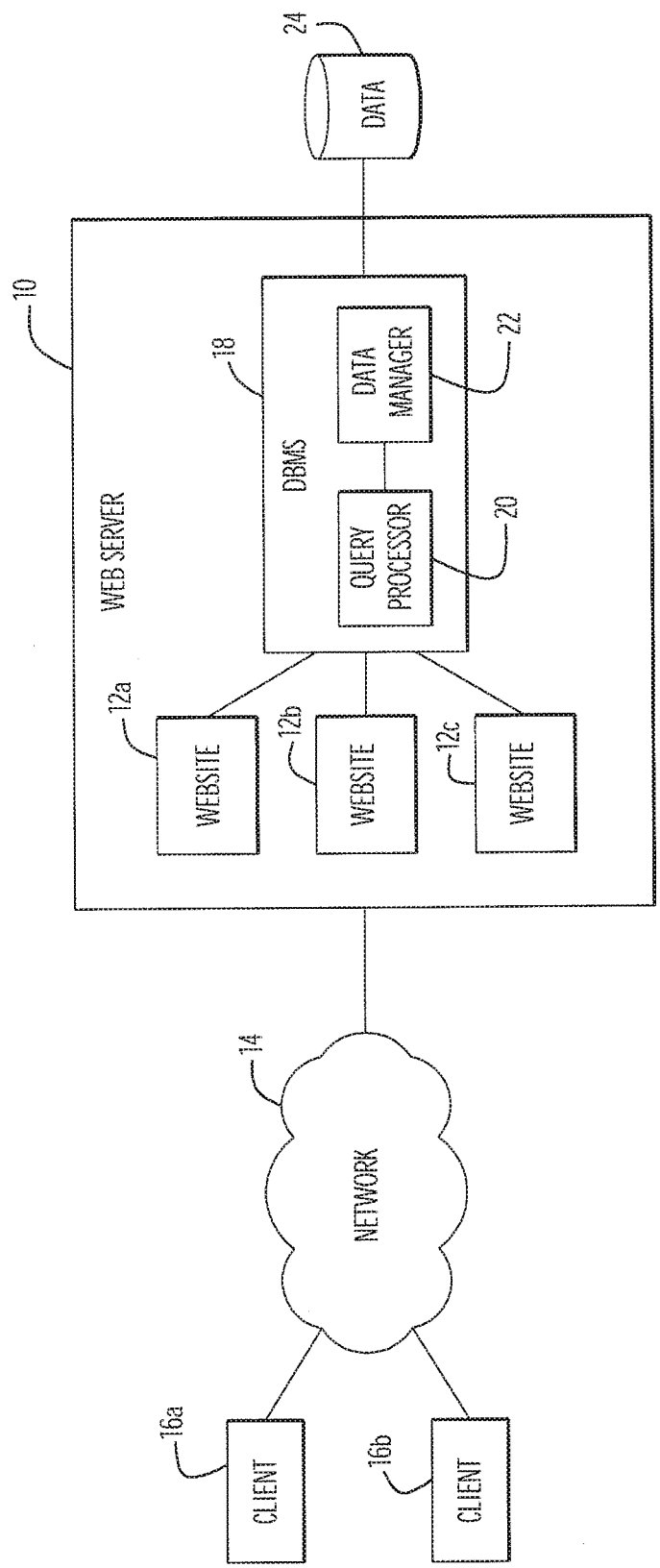
FIG. 1 is a block diagram showing a web host having a conventional database management system managing data for more than one web site.

The embodiments described below are described with reference to the above drawings, in which like reference numerals designate like components.

Certain conventional database management systems (DBMS) provide some capabilities to limit access to rows within the database. However, those conventional systems rely on a database administrator to create views that restrict access to the desired rows. The application programmer must then use those special views to enforce the security controls. Often, the application programmer must populate session variables with values that the views use to control access to the data rows. Although such conventional systems do allow a programmer to control access to the data, those conventional systems suffer from several disadvantages.

For example, conventional DBMSs use views to control access to a database. Using views to control access to the database is cumbersome for the database administrator and the application programmer to implement. For example, it is common to have to create separate views for each security level (e.g., a TOP_SECRET VIEW, a SECRET VIEW, etc.) in the security scheme.

Using views to control access is also error prone, since it is easy to implement the views incorrectly and inadvertently permit access to the wrong data rows. Also, some security schemes are difficult to express as additional predicates on the view or user query. There is a need to automatically enforce access to the data such that no changes are required to the user application logic or views.

The security policy achieved using views is only discretionary rather than mandatory. A person with database administrator authority is able to view the data in the database without using the special views that implement the security mechanism. There is a need to provide mandatory security controls that prevent unauthorized access by end users, application programmers, and database administrators. In order to limit the universe of users with access to data in the database, the system security administrator should be the only individual with unbridled access to the data.

FIG. 1 shows a system level diagram of a conventional database application, involving a web server 10 hosting a plurality of web sites, namely web site 12a, web site 12b and web site 12c. The web server is connected to a data communications network 14, such as the Internet, that provides connectivity with a plurality of clients, such as clients 16a and 16b. The web server includes a single DBMS 18 that services each of the web sites. The DBMS manages data used by the plurality of web sites. Since many web sites are hosted by the web server, yet are served by a single DBMS, security must be provided to prevent unauthorized access of data from one web site by a person using another web site hosted by web server 10. In conventional web servers, the DBMS includes a query processor 20 and a data manager 22. The DBMS 18 is connected to a data repository 24 that holds data managed by the DBMS.

The query processor 20 processes requests containing queries received at a web site from a client. For example, a typical query might be a Structured Query Language (SQL) query that is received at a web site. The SQL query is passed to the query processor 20 for parsing and execution by the DBMS. Based on the query, the query processor 20 controls the data manager 22 to interact with the data repository 24 to handle the appropriate data satisfying the query.

FIG. 2A shows an example of a conventional user table (USER.TABLE) 26 held within the DBMS shown in FIG. 1. The table contains various columns of data, labeled Col1, Col2, and Col3 shown in FIG. 2A. The user table also includes a security label (SECLABEL) column. Each row is associated with a specific security label. Here, the security labels are the names of various colors such as red, blue, yellow, green, for example. Each color name represents a particular set of security privileges associated with the user table row. For example, a security label of "red" may have one set of access privileges associated with that label, whereas another security label, such as security label blue, is associated with another set of privileges.

Access to USER.TABLE, in a conventional DBMS, is controlled by a database view. A system administrator creates a view of the related tables within the database in order to restrict access based on a user's security label.

The system administrator creates a table by using, for example, SQL statements as shown in FIG. 2B. Here a system administrator creates a view called USER.VIEW 28a in which the view is selected from three columns, namely, U.COL1, U.COL2, U.COL3, as shown in line 28b of FIG. 2. Those columns are selected from the USER.TABLE shown in FIG. 2A. A security table (SECURITY.TABLE) 30 relates a user ID (USERID) with a security label (SECLABEL) such as security labels "red", "blue", or "green." This is shown in line 28c of FIG. 2B. Line 28d of FIG. 2B requires that the user security label equals the security label defined in the security table, and that the user ID in the security table equals the current user. This limits access to only those rows in USER.TABLE of FIG. 2A that have a security label equal to the current user's security label. Although this conventional access control scheme provides a degree of access control, it does not support a hierarchical security scheme.

FIG. 2C shows a relationship between a security table 30 and the resulting view when the SQL statements of FIG. 2B are applied to USER.VIEW 32. If the view of FIG. 2B is applied for user "SALLY" to access the USER.TABLE 26, the result is shown in FIG. 2C. Here, in FIG. 2C, when the user SALLY requests access to the USER.TABLE, the view of FIG. 2B limits SALLY's view of the table 26 to the USER.VIEW 32 shown in FIG. 2C. When the view is applied to table 26, the USER.TABLE 26 is joined with SECURITY.TABLE 30 to produce USER.VIEW 32.

FIG. 2D shows an example query 34 requested by the user SALLY. SALLY's query includes a select SQL clause selecting all rows from USER.VIEW. The conventional DBMS system operates by applying the view shown in FIG. 2B to the USER.TABLE 26 shown in FIG. 2A. As shown in the SECURITY.TABLE 30 of FIG. 2C, SALLY's security label is "blue", and accordingly, the resulting user view 32 includes only those rows of USER.TABLE 26 having a security label equal to the security label "blue". In this manner, a conventional DBMS limits the user's access to only certain rows. However, this conventional access control technique does not support hierarchical security schemes, and it requires the use of views to limit access.

These problems with conventional database management systems can be overcome using the following concepts to provide row-level security.

1. Each end user of the database management system is assigned a SECURITY_LABEL. That label identifies a security level for the user within a multilevel security scheme and defines certain privileges for accessing data in the database. The security label also identifies security categories within that security level that the user is allowed to access. An example of a security category is a software development project on which the user is authorized to work. For example, a given user might be allowed to view data designated by certain security levels, such as the security levels: TOP SECRET, SECRET, and UNCLASSIFIED. That user also can be permitted to access data that pertains to certain categories, such as, for example, projects ABC, DEF, and XYZ. The value stored in the security label is encoded in a manner that expresses the security level and category information to the security system. An example of such an encoding is the label SECRETABC, where "SECRET" specifies the security level and "ABC" specify security categories A, B and C, which could be identifiers of projects on which the user is assigned to work.

The user's security label can be determined using different techniques. For example, the user's security label can be determined with a lookup using the relational DBMS catalog; by making a security call to an external security manager; or by a call to a trusted installation exit routine, for example. It will be understood that other techniques to determine the user's security label can be employed.

2. Each row within a secure table is associated with a security label, which can be a column within that security table. For example, that column can have a predetermined name (e.g. SECURITY_LABEL) or it can be identified through an SQL clause when the table is defined (e.g. AS SECURITY LABEL clause on the CREATE TABLE column definition). It will be understood that other techniques can be used to associate a security label with a row.

The SECURITY_LABEL column in the row identifies the security level of the data contained in the row, as well as security categories to which the row applies. For example, the row might contain data having a security level of "SECRET", that pertains to projects ABC and XYZ (security categories). The value stored in the SECURITY_LABEL is encoded in a manner that expresses the security level and category information to the security system.

3. A mandatory security enforcement mechanism controls read access to the secure data rows. That mechanism is activated automatically when a relational database table is known to include a SECURITY_LABEL column. This read security enforcement mechanism compares the user's security label to the row's security label to determine whether access should be allowed. Read access is allowed only if the user's security dominates the row's security, in which both of the following conditions are true:

a. The security level indicated by the user's security label is greater than or equal to the security level indicated by the row's security label.

b. The security categories associated with the row's security label are a proper subset of the security categories associated with the user's security label.

Write access is controlled separately, so that users can force compliance with the general rule of not reading from rows having higher security levels than the user or writing to rows having lower security levels than the user.

The read and write access security mechanisms can use several various techniques to enforce the access scheme, such as by using a lookup with the relational DBMS catalog; using a security call to an external security manager; or using a call to a trusted installation exit routine, for example.

4. A mandatory security enforcement mechanism controls write access to the secure data rows. This mechanism is activated automatically when a relational database table is known to include a specific column name. The mechanism determines which security label is recorded in the updated data rows to be written in the database. This write access security mechanism forces each of those updated rows to contain one of the following possible values.

a. A security label that is the same as the user's security label is used as the security label for the updated row.

b. If a user is specially authorized, that user is allowed to update rows using a row security label that has a lower level than the user's current security label indicates. The write access security mechanism verifies that the user's security dominates the row's security, such that all of the following conditions are true, before allowing the row to be updated.

i) The user is specially authorized to write data in a row having a security label designated for a security level lower than a security level associated with the user's security label.

ii) The security label specified for the row has a security level that is less than or equal to the security level associated with the user's security label.

iii) The security categories for the security label specified for the row are a proper subset of the security categories associated with the user's security label. That is, all the security categories associated with the row's label are also associated with the user's security label.

The write access security mechanism uses several different techniques to enforce the access scheme. For example, it can perform a lookup with the relational DBMS catalog; make a security call to an external security manager; or make a call to a trusted installation exit routine.

A DBMS that supports mandatory access control at the row level is illustrated in FIG. 3. Here, the DBMS 18, in addition to a query manager 20 and a data manager 22, also includes a read mandatory security unit 36 and a write mandatory security unit 38. An exemplary embodiment of DBMS 18 is IBM's DB2® for the z/OS® operating system. Each mandatory security unit is coupled to the data manager 22 and to the data storage unit 24. Both of the mandatory security units operate to control access by a user, or application program 40 such as a web site, to the data according to a hierarchical security scheme.

By placing the mandatory security units between the data manager 22 and the data repository 24, mandatory access control is achieved. If the data manager 22 attempts to read a row of data from the data storage unit 24, the request is directed through the read mandatory security unit 36. That security unit compares a user's security label passed by the data manager with a security label associated with the requested row of data in the data storage unit 24. If the conditions discussed above are met, access to the row is granted. That is, the read mandatory security unit 36 determines, from the user's security label, the user's security level and security categories. It also determines, from the row's security label, the row security level and row security categories. If the user's security level is greater than or equal to the security level for the row, and if the security categories associated with the row are a proper subset of the security categories associated with the user's security level, then read access is allowed. Since every attempted read access to the data passes through the read mandatory security unit, mandatory access control is achieved.

Similarly, when writing an updated row to the database, the write mandatory security unit 38 receives from the data manager 22 the request to store the row in the data storage unit 24. The write mandatory security unit 38 ensures that the conditions discussed above are met before allowing the row to be updated in the data storage unit 24. That is, the write mandatory security unit ensures that the user's security label indicates both that the user's security level and security categories correspond with the security level and categories indicated by the security label of the row to be updated.

Figure 4:
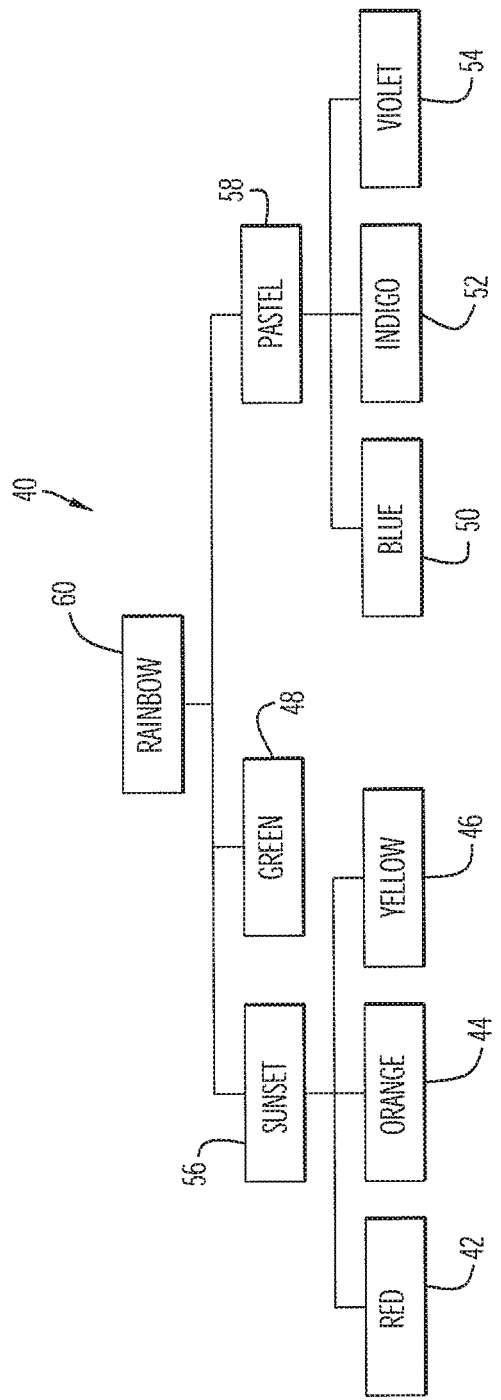
FIG. 4 shows an example of a security hierarchy scheme supported by the access control system shown in FIG. 3.

A hierarchical security scheme is illustrated, conceptually, in FIG. 4. Here, the security scheme shows security levels labeled using names of colors. For example, security level 42 bears the label "red," security level 44 bears the label "orange," and the security level 46 bears the label "yellow." Similarly, security level 48 bears the label "green," level 50 bears the label "blue," level 52 bears the label "indigo," and level 54 bears the label "violet." These security levels, namely the color names, are similar to the security label shown in FIG. 2A used in a conventional database. However, the scheme shown in FIG. 4 is a hierarchical security scheme in which security levels are grouped together to create different levels of security in a multilevel security system. For example, the security level 56 bearing the label "sunset" includes all the access privileges for the lower level security labels within its branch, namely, red, orange and yellow. Accordingly, the security label sunset is located at a higher level in the security scheme than the security labels red, orange and yellow. Similarly, the security level 58, labeled "pastel," includes all the privileges of the lower level security labels in its branch, namely, security labels blue, indigo, and violet. In this manner the pastel security label is located at a higher level in the hierarchical security scheme than the labels blue, indigo and violet.

Security level 60, labeled "rainbow" is located at the highest level of the security hierarchy. As shown in FIG. 4, the rainbow label includes all the privileges of every security label in the tree structure shown in FIG. 4. This hierarchical security scheme supports multilevel access control.

In a DBMS employing the mandatory security access controls described here, a user may query the DBMS tables directly and mandatory access control is automatically performed. This allows a query, such as query 62 shown in FIG. 5A, to be applied to the DBMS without having to use a view to control access as in a conventional DBMS. Here, a query from "BOSS 2," shown in FIG. 5A, includes a SELECT clause 62. The SELECT clause is intended to select all data from the user table "USER.TABLE." If the DBMS does not include any access control, the contents of the entire table would be returned regardless of the user's security level. However, when this query is applied to the DBMS having the mandatory access controls, shown in FIG. 3, the only rows of data that are returned are the rows that the user is authorized to access.

This control aspect is illustrated in FIG. 5B. Here, the user table 26 includes rows that each bear a security label, namely a security label "red," "blue," "yellow," etc. When the query shown in FIG. 5A, originating from a user or an application 40, is received by the DBMS the query processor 20 processes the query and sends requests to the data manager 22 to select all rows of the USER.TABLE 26. However, the read security unit 36 operates to limit the rows of the user table that are returned based on a security mechanism 64. A variety of security mechanisms can be used, such as a table as shown in FIG. 5B, that relates a user ID to a security label for the user. Although, it will be understood that other security mechanisms can be used to determine a security label associated with a user.

The security label might be a security level at a leaf node in the hierarchy shown in FIG. 4, such as security label "red" shown in row 64a. However, the security label might be a higher level label such as the security level "rainbow" shown in row 64b of the security mechanism 64. For example the user "BOSS 1" has access privileges defined in table 64 by the label "rainbow" in row 64b, thereby giving that user a higher degree of access. Similarly, another user, e.g., "BIG BOSS," also can use the same high level label, such as the rainbow security level, as illustrated in row 64c.

Another example of a hierarchical security level is shown in row 64d for the user ID "BOSS 2." BOSS 2 has a security label "sunset." As shown in FIG. 4, BOSS 2, having a security label of "sunset," has access privileges that include all the privileges of security labels red, orange, and yellow. Accordingly, when BOSS 2 submits the query shown in FIG. 5A, the read mandatory security unit compares the security label for BOSS 2 with the security labels for each of the rows in USER.TABLE 26. Since the "sunset" label includes all the privileges of the red, yellow, and orange security labels, the read mandatory security unit 36 returns the rows 26a, having a security label "red," row 26c having a security label "yellow," and row 26g having a security label "red." Since those security labels are subordinate in the hierarchy to the "sunset" label, as shown in FIG. 4, the other rows, namely, rows 26b, 26d, 26e, 26f, and 26h, are not returned because the security labels for those rows are not within the "sunset" branch of the hierarchy shown in FIG. 4. In this manner, the user BOSS 2 can submit query 62 shown in FIG. 5A without using a view to limit access to only those rows having a security level the same as or at a lower level than the security label associated with BOSS 2.

Figure 6:
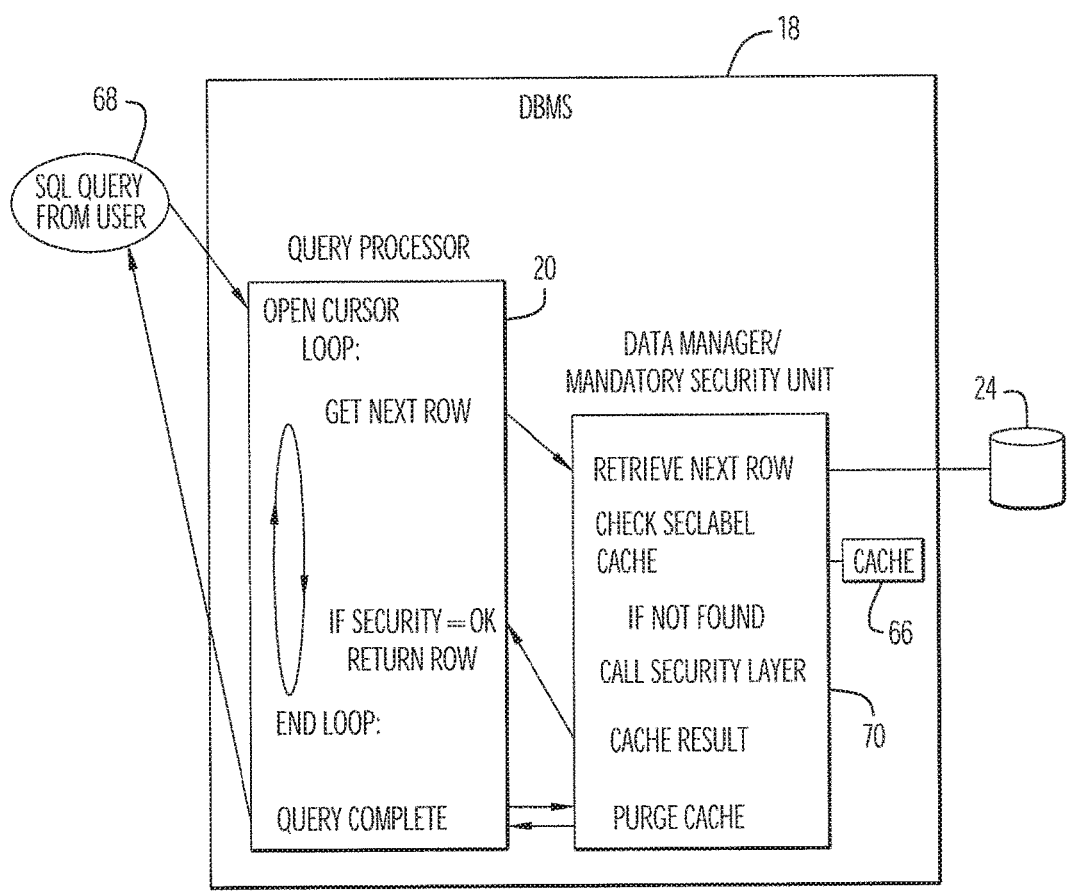
FIG. 6 illustrates the use of a cache in the database management system shown in FIG. 3 to improve performance when providing row-level mandatory access control.

FIG. 6 illustrates an alternative embodiment of the DBMS system shown in FIG. 3. Here a cache is employed to improve performance. The cache operates to store the security label information in readily available memory so that every time a row is accessed the security label need not be interpreted, whether by calling an external routine or performing a look-up to determine the security level and associated privileges, and categories associated with the particular security label. Here, the DBMS includes a cache 66 for holding the security label information that is determined for each query that is processed for a specific user.

In the embodiment shown in FIG. 6, a user submits an SQL query 68 to the DBMS. The query processor 20 processes the received query in a conventional manner. As shown in FIG. 6, the query begins by opening a cursor and executing a loop. The loop includes getting the next row which causes interaction with the data manager/mandatory security unit 70 shown in FIG. 6. The data manager/mandatory security unit 70 can include the functions of both the data manager and the read mandatory security units 36 and write mandatory security units 38 shown in FIG. 3, either individually or in combination. Here, in FIG. 6, they are shown in the same unit. For ease of description, the data manager/mandatory security unit 70 will be referred to simply as "data manager" 70.

The data manager 70 retrieves the next row from the data storage unit 24. Upon retrieving a row from the data storage unit 24 the data manager 70 performs the mandatory security function of checking whether the returned row includes a security label. If so, the cache 66 is searched to determine if information associated with that security label is already present in the cache. If so, the security information within the cache is used to compare the user security level with the security level associated with the retrieved row. If the security label is not found in the cache then the data manager 70 determines the information associated with the security label. This can be performed in various ways, such as by calling a security layer, as illustrated in FIG. 6. The result of the security label information determination is then placed in the cache 66 to thereby cache the result of the security label call.

Once the security information is available, the security level and category of the label associated with the retrieved row are compared with the security level and category associated with the user's security label. A determination then is made whether to allow the user to access that row.

If the result of the comparison is that the user is to be given access, then the row is returned to the query processor 20 for return to the user. The loop shown in the query processor 20 then continues until the query is complete.

When the query is complete, the query processor notifies the data manager which then purges the cache. In this manner, the cache information is used only for a single query by a single user. In other words, for each query made by a user, the security label information held in the cache is refreshed so that the information in the cache is present only during the time when a user's query is processed. A user's security level and a row's security level are assumed to stay unchanged during the period when a query is performed. However, by purging the cache after each query, changes to both the user's security level and to the security levels of rows in the data can occur without having to invalidate information held in the cache.

The following are examples of processes that can be used to provide row-level security with mandatory access control.

When a database administrator creates a table in the DBMS shown in FIG. 3, the administrator includes a SECURITY_LABEL column in the table. The administrator also can add a SECURITY_LABEL column to a table to be protected. The DBMS uses the presence of the SECURITY_LABEL column to automatically activate row-level security. Thus, the row-level security mechanism is driven by the presence of the SECURITY_LABEL column and the content of the data row. The SECURITY_LABEL column enables the use of security controls for rows in a database that do not depend upon database administrators creating special views that identify the rows that each user is allowed to access. Such security controls make row-level security mandatory for the table whenever the security label is present, and those controls cannot be bypassed by directly accessing the table (i.e. using or avoiding special views that control row access). The security label stored in each row has an encoded value that encapsulates the following two specific pieces of information.

a. The security level of the data contained in the row. This allows implementation of multilevel, hierarchical security schemes (e.g., TOP SECRET, SECRET, UNCLASSIFIED).

b. The security categories to which this row of data applies. For example, a row of data might be associated with six security categories (e.g., projects A, B, C, D, E, F on which the row is used). The security label can be encoded in a manner that allows the security mechanism to determine the subset of the possible security categories to which this row of data pertains.

When the end user logs on to the DBMS, the user will provide authentication tokens (e.g., userid/password, KERBEROS ticket, etc.) that identify the user to the DBMS. Once the user's identity has been ascertained, the DBMS determines the security label associated with the end user. This can be done using many different techniques, such as via a table lookup in the DBMS's authorization tables; via a security check to an external security product; or via a trusted user exit routine, for example. As with the security label for the row, the user's security label is encoded to encapsulate the following information.

a. The security level of the data the user is authorized to access. This allows implementation of multilevel, hierarchical security schemes (e.g., TOP SECRET, SECRET, UNCLASSIFIED levels).

b. The security categories the user is associated with and authorized to access. For example, a user might be associated with three different projects (e.g., projects A, B and C, each of which can be designated as a security category).

Figure 7A:
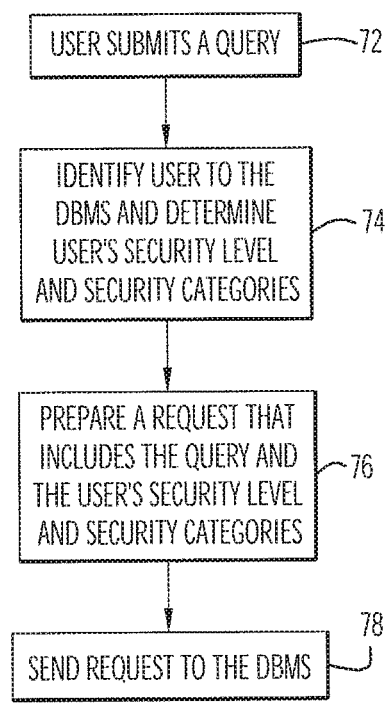
FIGS. 7A and B are flowcharts for querying a database management system that provides mandatory row-level access control.

FIG. 7A illustrates a process for a user to query a database in which mandatory access controls are present. A user, in operation 72, prepares a query for submission to a DBMS that has a table that includes a SECURITY_LABEL column. The user, by logging on to the DBMS or by another method, is identified to the DBMS. The user's security level and security categories are determined in operation 74 using the techniques described earlier. A request with the user's query is prepared in operation 76 by a client, for example, in a client/server system. The request includes, in addition to the query, a user security label encoded with the user's security level and security categories. The request is sent in operation 78 to the DBMS.

Figure 7B:
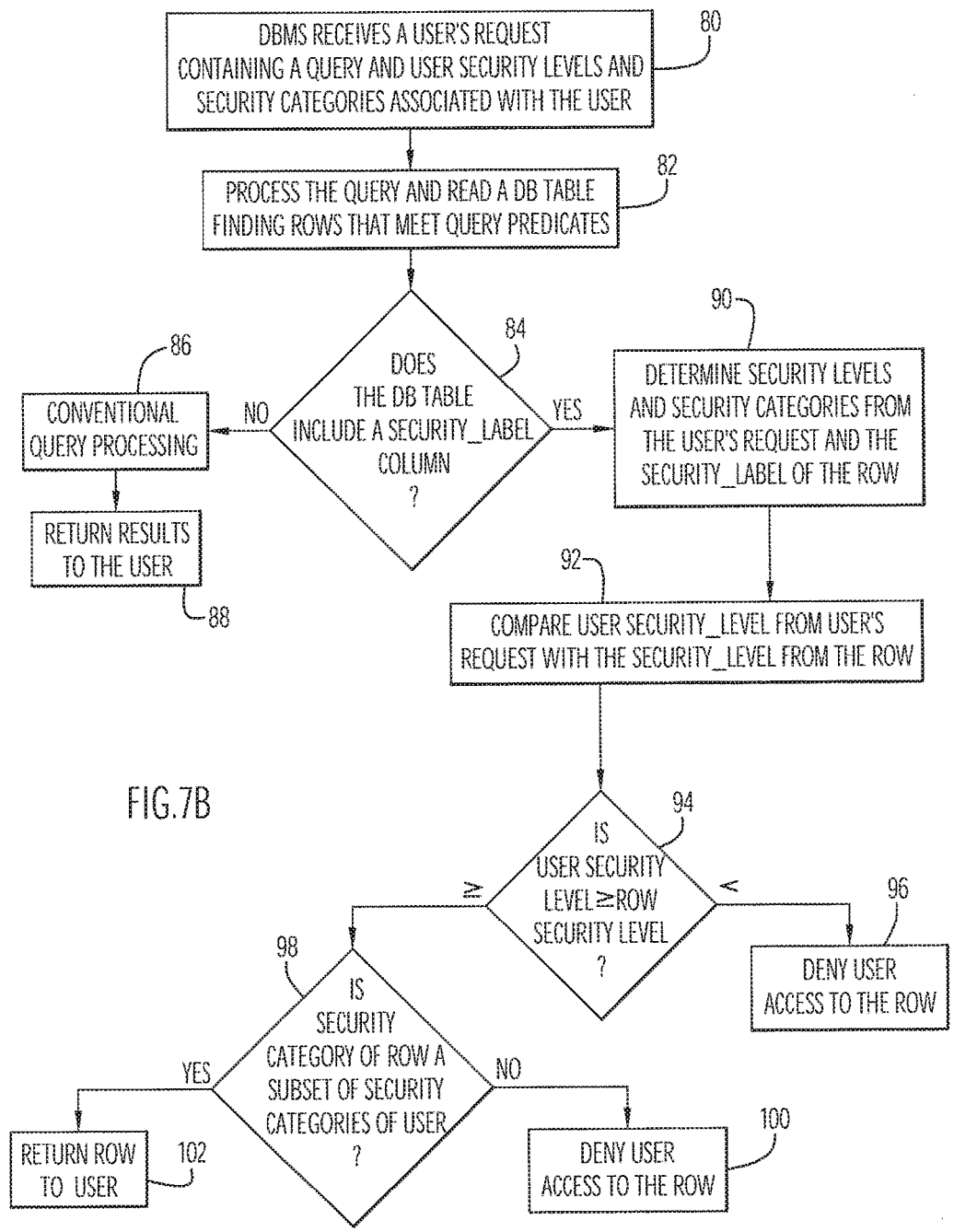

Referring to FIG. 7B, the DBMS receives the user's request in operation 80. In operation 82 the DBMS, through the query processor and data manager, processes the query and scans the requested tables to find rows that satisfy the user's query predicates. Before returning any data to the user application, the DBMS invokes the security mechanism to determine whether the user is authorized to view the data. The first decision, in operation 84, is to determine if the database table has a SECURITY_LABEL column. If the table does not have a SECURITY_LABEL column, then the query is processed in a conventional manner in operation 86 and the results of the query are returned to the user in operation 88.

If the table has a SECURITY_LABEL column, then the security mechanism is invoked in operation 90 where the user's security level and security categories are determined by decoding the user's security label. The row's security label is retrieved from the SECURITY_LABEL column and decoded. The security mechanism can be implemented in many ways, such as via a lookup within the DBMS's authorization tables, via a call to an external security product, or via an installation exit routine, for example. The security mechanism is responsible for examining the row's security label to determine whether the user is authorized to retrieve that particular row. This is accomplished in operation 92 by comparing the user's security level with the row's security level. There are two possible cases for each row.

a. The security label of the row has a value that is within a range of values that are accessible to the user. This is the case when the user's security dominates the row's security, both of the following conditions are true.

i) The security level indicated by the user's security label is greater than or equal to the security level indicated by the row's security label, as determined in operation 94. If not, the user is denied access to the row in operation 96. If so, then the next condition is tested in operation 98.

ii) The security categories associated with the row's security label are a proper subset of the security categories associated with the user's security label, as determined in operation 98. If that is the case, the DBMS processes the row and retrieves the requested data values and returns the result to the user in operation 102. If not, the user is denied access to the row in operation 100.

b. The security label associated with the row is outside the range of values corresponding to the user's security label. In this case, the DBMS either ignores the row, or declares an attempted security violation depending upon the security policy employed for the database management system. The user is thus denied access to the protected row, as shown in operations 96 and 100.

To minimize the computer processor usage and elapsed time associated with the row-level security checks, the DBMS can cache the row security label values that were authenticated successfully during the course of running the transaction, in cache 66 shown in FIG. 6, during the course of processing a user's transaction. If subsequent rows are encountered with security label values that are already present in the user's cache, the security check can be bypassed, since that particular security label value already passed the security check. The cache of validated security label values is destroyed at database commit and rollback boundaries, so that subsequent changes in the security policy are reflected in the next unit of work.

Having the security mechanism check both security level and security category gives the security mechanism a great deal of flexibility in supporting various security policies. Some examples of this include the following.

a. An installation might choose to allow access only on an exact match (user security label="RED" and row security label="RED").

b. An installation might choose to allow access only when the row's security label is a proper subset of the user's security label (user security label="RAINBOW" which means "RED," "ORANGE," "YELLOW," "GREEN," "BLUE," "INDIGO," and "VIOLET" are allowable values for the row security label for this user).

c. An installation might choose to allow access based on a hierarchy. For example, a "TOP SECRET" security label for the user would allow access to all security levels at that same level and below, namely for "TOP SECRET", "SECRET", and "UNCLASSIFIED" row security label values.

d. Combinations of the above schemes also can be used, depending on the application.

Figure 8A:
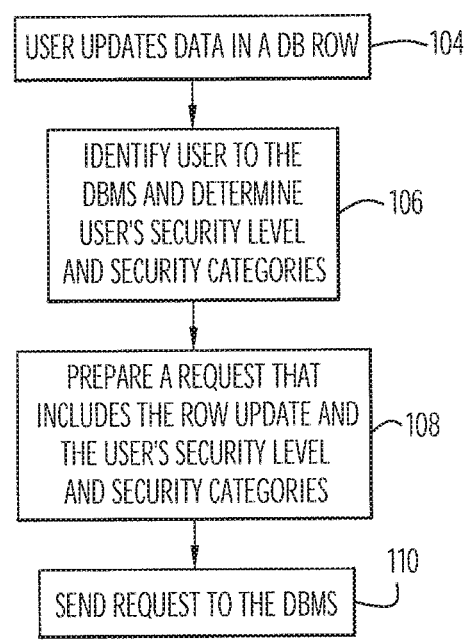
FIGS. 8A-C are flowcharts illustrating sending a request for a row update and updating the row in a database management system that provides mandatory row-level access control.

Referring to FIG. 8A, when the user, in operation 104, requests an update to data in a row of a database table, either a change to the data in the row or inserting a row, the user is identified and the user's security level and security categories are determined in operation 106. A request is prepared in operation 108 that includes the row update as well as the user's security level and categories. That request is then sent to the DBMS in operation 110.

Figure 8B:
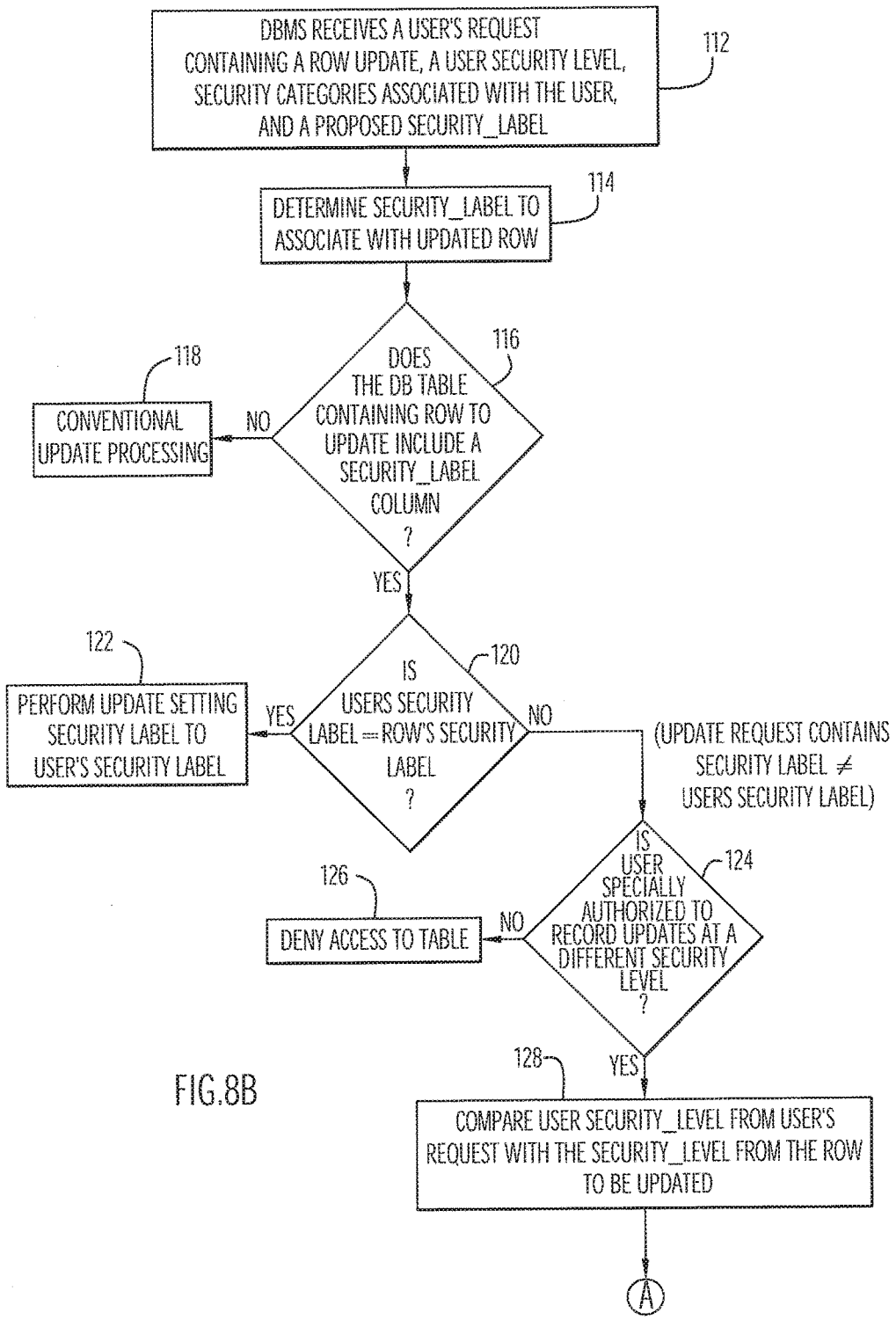

Referring to FIG. 8B, once the user issues an update request, such as an SQL request that updates data (INSERT, UPDATE, etc.), the DBMS receives that request in operation 112. The request includes the update to the data in the row and the user's security label which indicates the user's security level and security categories. The security mechanism determines a security label to associate with the updated row, in operation 114. In this embodiment, the user's security label is used as the security label for the updated row. Alternatively, a different security label can be selected, based on criteria appropriate for the application and operating environment. In operation 116 the security mechanism determines if the row to be updated contains a SECURITY_LABEL column. If not, the update is processed in a conventional manner in operation 118.

If the row includes a SECURITY_LABEL column, then operation 120 is performed which determines if the user's security label is equal to the security label for the row. If it is, the update is performed in operation 122, and the row's security label is set equal to the user's security label.

If the user's security label is not equal to the row's security label, then it is determined in operation 124 if the user is specially authorized to record updates with a security level that is different from the user's security level. If the user is not specially authorized, then access for making the update to the table is denied in operation 126. However, if the user is specially authorized, then the user's security level, determined from the user's security label, is compared with the security level for the row to be updated, in operation 128 to determine if the user's security dominates the row's security. In this operation the user's security label and the row's security label are decoded to determine the security information encoded therein. This decoding operation can be implemented using many different techniques, such as via a lookup within the DBMS's authorization tables; via a call to an external security product; or via an installation exit routine, for example. The information from the decoded security labels, such as the security level information, is compared in operation 128.

Figure 8C:
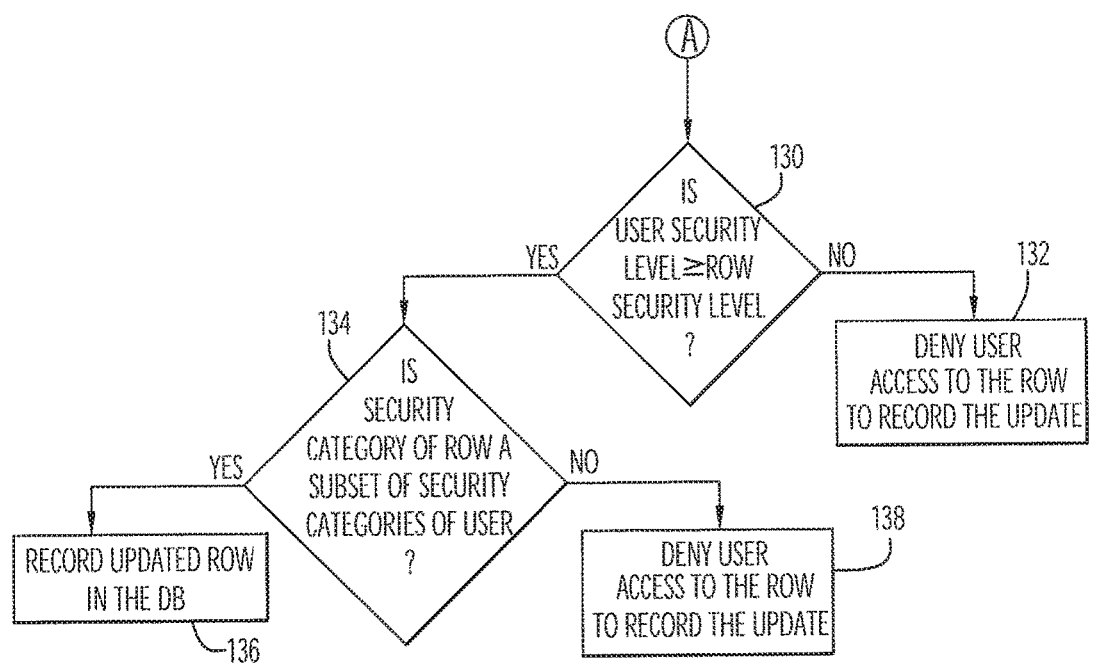

Following connector "A" to FIG. 8C, in operation 130 it is determined, based on the comparison, if the user's security level is greater than or equal to the security level for the row. If not, the user is denied access to the row to make the update, in operation 132. However, if the user's security level is greater than or equal to the row's security level, then operation 134 is performed to compare security categories.

In operation 134, if the security categories of the row to be updated form a proper subset of the user's security categories, then the updated row is recorded in the database, in operation 136. The security categories for the row form a proper subset of the security categories for the user if all of the row's security categories are included in the set of security categories for the user. However, if the security categories for a row do not form a proper subset of the security categories of the user, then in operation 138 the user is denied access to update the row.

In updating a row, the security mechanism, such as the write mandatory security unit 38, shown in FIG. 3, can be provided not only with the user's security label value but also with a proposed value of the row's security label. That proposed value can be provided, for example, by the user's SQL update operation. The security mechanism can choose to allow the row's security label to be recorded without change, or it can choose to force a different value into the row's security label based on the installation's security policy. This allows installations to employ any desired security policy. For example, a security policy can be chosen to force all updates to record in the modified row's security label the security label of the user who made the update. An alternative security policy can be chosen to allow selected users to make updates with row security label values that are different than the user's security label. Examples of such a security label value are a value that is a proper subset of the user's security label values, and a value that is less than or equal to the user's security level.

IBM Corporation's Resource Access Control Facility (RACF®) is an example of a product that can be used to perform the functions of the mandatory security units. According to one embodiment, a database table can activate row level security support by adding a specially named column that acts as the security label. A RACF® exit is used to check for each security label value that is accessed within a cursor, and determine whether a SQL query requester submitting an SQL query is allowed to access the data row. The security layer in RACF® will understand hierarchical relationships such as the hierarchy representing the colors of the rainbow illustrated in FIG. 4.

With that hierarchy established in RACF®, the DBMS understands that users with authority to access pastel information can access any row associated with blue, indigo, violet, or pastel. With these capabilities that type of security scheme can be implemented without requiring application programs to access the data using special views or predicates.

Having described apparatuses, articles of manufacture and methods of providing row-level security in a relational database management system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

TRADEMARKS

IBM, DB2, z/OS and RACF are trademarks or registered trademarks of International Business Machines, Corporation in the United States and other countries.

What is claimed is:

1. A computer-implemented method of controlling access to a relational database, comprising:
    receiving via a network from a user computer, by a server computer, a user request for data from the relational database, the user request including a user security label and a request to perform a database operation;
    determining, by a server computer, whether a security label column is included in a table of the relational database, the security label column storing, in each row of the table, a row security label, which indicates a security level required by a user of the user request to access the data contained in a respective row in the table; and
    automatically activating, by the server computer, a mandatory security enforcement mechanism, independent of the relational database operation to access the database, as a result of determination that the security label column is included in the table of the relational database;
    wherein the mandatory security enforcement mechanism is automatically activated independent of creating a view based on the database operation to access the relational database;
    the mandatory security enforcement mechanism comprising:
        determining user security information from the user security label;
        determining row security information for each row to be accessed by the database operation being performed by the request, from the security label column in the respective row;
        comparing the user security information and the row security information, the user security information and the row security information being unchanged during a period when the database operation is performed;
        retrieving one or more rows of data from the table in the relational database based on a result of the comparing the user security information and the row security information; and
        returning, to the user computer, only the one or more rows for which the user is determined to have authorization to access for performing the database operation on the rows.

2. The method of claim 1, wherein the request contains one or more queries of one or more tables.

3. The method of claim 1, wherein the table containing the rows of data contains access control information for limiting user access to the relational database.

4. The method of claim 1, wherein the database operation is a query.

5. The method of claim 1, wherein the database operation involves a row update.

6. The method of claim 1, wherein said determining row security information includes checking a cache for row security information corresponding to respective row security label.

7. The method of claim 1, wherein the user security label is one of plurality of security labels arranged in a hierarchy of security levels.

8. The method of claim 1, wherein the user is authorized to modify the row only when the user security information is equal to the row security information.

9. A computer-implemented method of controlling access to data in at least one row of a relational database, wherein said at least one row is associated with row-level access control information, the method comprising:
    receiving via a network from a user computer, by a server computer, a user request to operate on the relational database, the user request including a user security label, which indicates a user security level and a request to perform a database operation;
    determining, by a server computer, whether a security label column is included in a table of the relational database, the security label column storing, in each row of the table, a row security label, which indicates a row security level required by a user of the request to access the data contained in a respective row in the table; and
    automatically applying, by a server computer, mandatory access control rules to rows of the database satisfying the request independent of creating a view based on the database operation to access the relational database when the security label column is included in the table of the relational database, by determining whether privileges associated with a first security level are included in the privileges associated with a second security level,
    the applying the mandatory access control rules comprising:
        determining row security information for each row to be accessed by the database operation being performed by the request, from the security label column in the respective row;
        comparing the user security level and the row security level, the user security level and the row security level being unchanged during a period when the database operation is performed;

retrieving one or more rows of data from the table in the relational database based on a result of the comparing the user security level and the row security level; and returning data from one or more rows in the relational database to the user computer, if the row security level associated with one or more rows is at least a subset of the user security level, to perform the database operation on the one or more rows.

10. The method of claim 9, wherein the request is a Structured Query Language (SQL) query.

11. The method of claim 9, wherein the relational database comprises a plurality of tables and the received request includes a request for access to at least one of the plurality of tables.

12. The method of claim 9, wherein the subset of the user security level corresponds to all security levels equal to or lower than the security level of the user.

13. A computer-implemented method of controlling a user's access to data in rows of a relational database, the method comprising:
  receiving via a network, by using a server computer, a user request from a user computer to operate on the relational database, the user request including a user security label and a request to perform a database operation;
  determining, by the server computer, whether a security label column is included in a table of the relational database, the security label column storing, in each row of the table, a first access level, which indicates a row security level required by a user of the user request to access the data contained in a respective row in the table; and
  automatically activating, by the server computer, a mandatory security enforcement mechanism, independent of creating a view based on the relational database operation to access the database, when the security label column is included in the table of the relational database;
  the mandatory security enforcement mechanism including:
  determining whether the user is authorized to operate on a row of the relational database that satisfies the request by comparing the first access level stored in the security label column of the table and a second access level and determining whether privileges associated with the first access level are included in the privileges associated with the second access level included in the user security label, the first access level and the second access level being unchanged during a period when the database operation is performed;
  retrieving one or more rows of data from the table in the relational database based on a result of the comparing the first access level and the second access level; and
  returning data from the one or more rows only if the user is determined to be authorized to perform the database operation on the one or more rows.

14. The method of claim 13, wherein the determining whether the privileges associated with the first access level are included in the privileges associated with the second access level comprising: determining whether the first access level is equal to or lower than the second access level.

* * * * *